United States Patent
Miyaki

(10) Patent No.: US 7,060,389 B2
(45) Date of Patent: *Jun. 13, 2006

(54) NONAQUEOUS ELECTROLYTE SECONDARY BATTERY

(75) Inventor: Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/077,480

(22) Filed: Mar. 10, 2005

(65) Prior Publication Data

US 2005/0181276 A1    Aug. 18, 2005

Related U.S. Application Data

(63) Continuation of application No. 10/385,159, filed on Mar. 10, 2003, now Pat. No. 6,908,709, which is a continuation-in-part of application No. PCT/JP02/07011, filed on Jul. 10, 2002.

(30) Foreign Application Priority Data

Jul. 10, 2001    (JP)    ............................ P2001-209727

(51) Int. Cl.
H01M 4/58    (2006.01)

(52) U.S. Cl. .............................. 429/231.4; 429/231.8; 429/218.1; 429/232; 429/231.1; 429/231.3; 429/221; 429/223; 429/224

(58) Field of Classification Search ................ 429/221, 429/231.4, 223, 231.8, 218.1, 232, 231.1, 429/231.3, 224

See application file for complete search history.

(56) References Cited

U.S. PATENT DOCUMENTS

| 6,541,157 B1 * | 4/2003 | Inagaki et al. ............... 429/233 |
| 2004/0029004 A1 * | 2/2004 | Miyaki ....................... 429/221 |

FOREIGN PATENT DOCUMENTS

| JP | 10-223221 | 8/1998 |
| JP | 10-308207 | 11/1998 |
| JP | 2000-12037 | 1/2000 |
| JP | 2000-311681 | 11/2000 |
| JP | 2001-143761 | 5/2001 |
| WO | WO 00/17948 | 3/2000 |

\* cited by examiner

*Primary Examiner*—Laura Weiner

(74) *Attorney, Agent, or Firm*—Sonnenschein Nath & Rosenthal LLP

(57) ABSTRACT

The present invention relates to a nonaqueous electrolyte secondary battery comprising an anode capable of doping with and dedoping from lithium, a cathode and a nonaqueous electrolyte. The anode includes a carbon material, a polymer material and an Sn-containing compound expressed by a below general formula (1)

$$SnM^1_x M^2_y M^3_z \qquad (1)$$

(In the formula, $M^1$ designates at least one kind of material selected from Co and Cu, and $M^2$ designates at least one kind of material selected from Cr, Fe, Mn, Nb, Mo, W, B and P. $M^3$ designates at least one kind of material selected from In, Ag, Zn and Al. x, y and z are respectively represented by $0.1 < x \leq 2$, $0 < y \leq 2$ and $0 < z \leq 1$.).

1 Claim, 1 Drawing Sheet

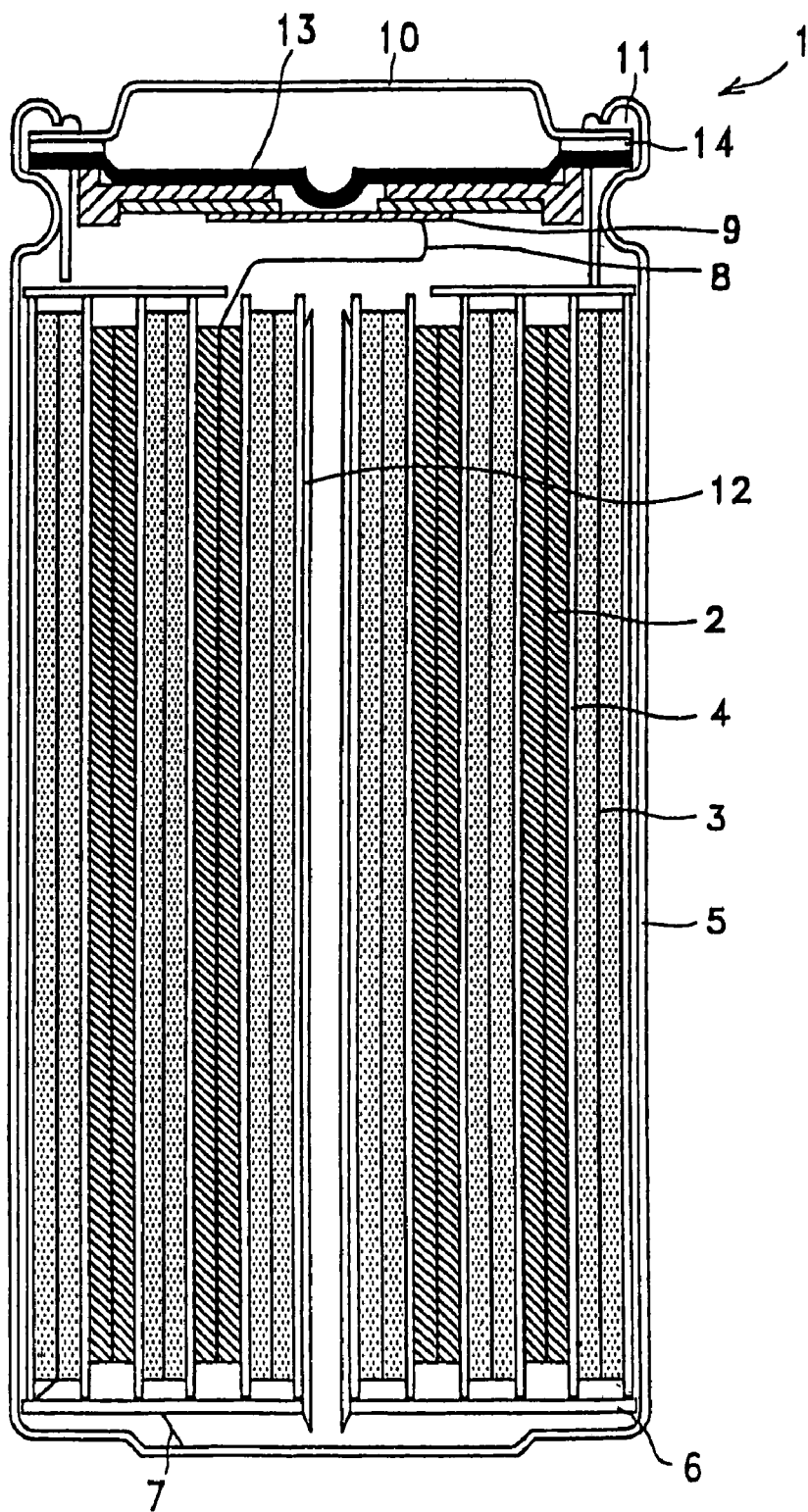
F I G. 1

NONAQUEOUS ELECTROLYTE SECONDARY BATTERY

RELATED APPLICATION DATA

The is a continuation of U.S. application Ser. No. 10/385,159 filed Mar. 10, 2003 which has since issued as U.S. Pat. No. 6,908,709 which claims priority to Japanese Application Nos. P2001-209727 filed Jul. 10, 2001 and is a continuation-in-part of PCT/JP02/07011 filed Jul. 10, 2002, all of which are incorporated herein by reference to the extent permitted by law.

TECHNICAL FIELD

The present invention relates to a nonaqueous electrolyte secondary battery excellent in its high capacity and cyclic characteristics.

BACKGROUND ART

As portable electronic devices, electronic devices such as video cameras with video tape recorders, portable telephones, lap top computers, or the like have been usually broadly employed. These portable electronic devices have been devised to be compact and light by considering the utility of them. As power sources used for the portable electronic devices which are designed to be compact and light, compact and light secondary batteries having high energy density have been demanded in order not to prevent the electronic devices from being compact and light.

For meeting such a demand, there have been provided nonaqueous electrolyte secondary batteries which employ a graphite material using the intercalation reaction of lithium ions between graphite layers or a carbonaceous material to which doping and dedoping actions of lithium ions to pores as an anode material.

As the performance of the recent portable electronic device has been improved, a demand for the capacity of the secondary battery used for such a electronic device has been more increased. As a secondary battery for meeting such a demand, when light metal such as lithium metal is directly employed as the anode material of the nonaqueous electrolyte secondary battery, the light metal is apt to be deposited in the shape of a dendrite on an anode during a charging process and a current density becomes extremely high at the end of the dendrite. Therefore, a cycle life is disadvantageously decreased due to the decomposition of nonaqueous electrolyte solution or the internal short-circuit of the battery is inconveniently generated due to an excessive growth of the dendrite.

In order to solve such problems, a secondary battery using lithium-lead alloy is proposed as an anode material in Japanese Patent Publication No. hei 3-53743, Japanese Patent Publication No. hei 5-34787, Japanese Patent Publication No. hei 7-73044 and Japanese Patent Publication No. hei 8-138654. In Japanese Patent Publication No. hei 4-47431 and Japanese Patent Publication No. hei 3-64987, a secondary battery using bismuth-tin-lead-cadmium alloy is proposed. There is a possibility that lead, bismuth and cadmium used therein may degrade a global environment when they are discharged outside.

In Japanese Patent Laid-Open No. hei 7-302588, Japanese Patent Laid-Open No. hei 10-199524, Japanese Patent Laid-Open No. hei 7-326342, Japanese Patent Laid-Open No. hei 10-255768 and Japanese Patent Laid-Open No. hei 10-302770, a secondary battery using a silicon alloy as an anode material is proposed. Although the silicon alloy used in this battery has a very little problem to a global environment, it has some reaction with an organic solvent. Consequently, the silicon alloy is low in its cyclic characteristics with charging and discharging operations repeated as required for the secondary battery, so that it is difficult to put the silicon alloy to practical use.

In Japanese Patent Publication No. hei 4-12586, Japanese Patent Laid-Open No. hei 10-16823 and Japanese Patent Laid-Open No. hei 10-308207, a secondary battery employing an alloy material using tin and nickel is disclosed. The nickel used here is insufficient in view of cyclic characteristics. In Japanese Patent Laid-Open No. sho 61-66369, a secondary battery using lithium, aluminum and tin as an anode material is disclosed. In Japanese Patent Laid-Open No. sho 62-145650, a secondary battery using an alloy of tin and zinc is disclosed. However, both the secondary batteries disclosed in these publications are disadvantageously serious in their cyclic deterioration in accordance with changes of material forms due to the doping and dedoping of Li. In Japanese Patent Laid-Open No. hei 8-273602, a secondary battery using a tin alloy including phosphorus of 1 wt % to 55 wt % as an anode material is disclosed. However, this battery is not satisfactory in its cyclic characteristics.

In Japanese Patent Laid-Open No. sho 10-308207, a secondary battery using an alloy of tin and copper as an anode material is disclosed. However, this battery shows a discharging capacity of 300 mAh/g for a first cycle, which is lower than that of a currently used carbon material, so that this battery is insufficient to be put to practical use. In Japanese Patent Laid-Open No. hei 11-86854, is disclosed a secondary battery using as an anode material a mixture composed of a tin-containing phase which dopes with Li and a phase having Mn, Fe, Co, Ni and Cu which does not dope with Li. Since this battery has the phase which does not dope with Li in the mixture to prevent the movement of Li, its cyclic characteristics are not satisfactory.

DISCLOSURE OF THE INVENTION

The present invention is proposed by taking the above-described conventional circumferences into consideration and it is an object to provide a nonaqueous electrolyte secondary battery using an anode material high in its capacity and cyclic characteristics.

A nonaqueous electrolyte secondary battery according to the present invention proposed to achieve the above-described object comprises an anode capable of doping with and dedoping from lithium, a cathode and a nonaqueous electrolyte, wherein the anode includes a carbon material, a polymer material and an Sn-containing compound expressed by a below general formula (1).

$$SnM^1_x M^2_y M^3_z \qquad (1)$$

(In the formula, $M^1$ designates at least one kind of material selected from Co and Cu, and $M^2$ designates at least one kind of material selected from Cr, Fe, Mn, Nb, Mo, W, B and P. $M^3$ designates at least one kind of material selected from In, Ag, Zn and Al. x, y and z are respectively represented by $0.1 < x \leq 2.0 < y \leq 2$ and $0 < z \leq 1$.)

In the nonaqueous electrolyte secondary battery according to the present invention, since the anode includes the Sn-containing compound represented by the general formula (1), while a high capacity is realized, the decay of particles due to the change of volume upon charging and discharging operations can be suppressed. The Sn-containing compound does not include such elements as to give adverse effects to a global environment.

Still other objects of the present invention and specific advantages obtained by the present invention will be more apparent from the following description of a specific embodiment.

BRIEF DESCRIPTION OF THE DRAWINGS

FIG. 1 is a longitudinally sectional view of one structural example of a nonaqueous electrolyte secondary battery according to the present invention.

BEST MODE FOR CARRYING OUT THE INVENTION

Now, a nonaqueous electrolyte secondary battery according to the present invention will be specifically described by referring to a drawing.

The nonaqueous electrolyte secondary batter according to the present invention has a structure as shown in FIG. 1. In the nonaqueous electrolyte secondary battery 1 shown in FIG. 1, a battery can 5 is filled with a spirally coiled body in which a film type cathode 2 and a film type anode 3 are spirally coiled through a separator 4 in a tightly contacted state.

The cathode 2 is manufactured by applying a cathode composite mixture including a cathode active material and a binding agent on a cathode current collector and drying the cathode composite mixture. As the current collector, a metallic foil such as an aluminum foil is employed.

As the cathode active material, lithium-containing transition metal oxide or the like may be used. As transition metals M forming the lithium composite oxide, Co, Ni, Mn, Fe, etc. are preferably used. There may be included alkali metals except lithium (elements of a first (IA) group and a second (IIA) group of a periodic table) and/or elements such as Al, Ga, In, Ge, Sn, Pb, Sb, Bi, Si, P, B, etc. The amount of mixture of these elements is preferably located within a range of 0 to 30 mol %.

As preferable lithium composite oxides, there may be exemplified $LiCoO_2$, $LiNiO_2$, $LiNi_xCo_{1-x}O_2(0.2<x<1)$, $LiMn_2O_4$, $LiFePO_4$, $LiMn_xFe_{1-x}PO_4(0<x<0.65)$, $LiCoPO_4$, etc. A plurality of these cathode active materials may be mixed and employed.

As the binding agent of the cathode composite mixture, not only a well-known binding agent ordinarily used for the cathode composite mixture of a battery can be employed, but also a well-known addition agent such as a conductive agent can be added to the cathode composite mixture.

The anode 3 is manufactured by applying an anode composite mixture including an anode active material and a binding agent on an anode current collector and drying the anode composite mixture. As the current collector, for instance, a metallic foil such as a copper foil is used.

As the anode active material, a carbon material is used. As the carbon material, ate preferably used materials having a lithium ion doping and dedoping capability. Natural graphites, artificial graphites and non-graphitizable carbons such as scale type graphites, flake graphites, earthy graphites are preferable. Further, fine particle carbon such as acetylene black, Ketjen black may be included. The content of the carbon material is preferably located within a range of 5 wt % to 85 wt % and more preferably located within a range of 5 wt % to 70 wt % relative to all of the anode composite mixture.

When the content of the carbon material is less than 5 wt % relative to all of the anode composite mixture, the permeation of electrolyte solution to the anode is deteriorated to decrease a capacity. Further, when the content of the carbon material is more than 85 wt % relative to all of the anode composite mixture, the ratio of a below-described Sn-containing compound is lowered to decrease a capacity. Accordingly, the content of the carbon material is set to a range of 5 wt % to 85 wt % relative to all of the anode composite mixture, so that the permeation of the electrolyte solution to the anode is maintained and a suitable amount of Sn-containing compound can be included. Therefore, a capacity, load characteristics and cyclic characteristics can be improved.

As the binding agent, there may be exemplified polymer compounds such as fluoro rubber, ethylene-propylene-diene terpolymer (EPDM), polyvinyl pyrrolidone, styrene butadiene rubber, polybutadiene, etc. One kind of these polymer compounds may be independently used or a plurality of kinds of them may be mixed and the mixture may be used. Styrene-butadiene rubber, polyvinylidene fluoride and polyethylene are preferably employed among them. The rate of the polymer compound is preferably located within a range of 1 wt % to 30 wt % relative to all of the anode composite mixture and more preferably located within, a range of 2 wt % to 15 wt %.

Conductive polymer such as polyacetylene, polypyrrole, etc. may be added to the anode composite mixture or a well-known addition agent may be added to the anode composite mixture.

In the nonaqueous electrolyte secondary battery according to the present invention, the Sn-containing compound represented by a below general formula (1) is included in the anode composite mixture.

$$SnM^1_xM^2_yM^3_z \qquad (1)$$

(In the formula, $M^1$ designates at least one kind of material selected from Co and Cu, and $M^2$ designates at least one kind of material selected from Cr, Fe, Mn, Nb, Mo, W, B and P. $M^3$ designates at least one kind of material selected from In, Ag, Zn and Al. x, y and z are respectively represented by $0.1<x\leq2$, $0<y\leq2$ and $0<z\leq1$.)

The Sn-containing compound expressed by the general formula (1) is included in the anode, so that the capacity, the cyclic characteristics and the load characteristics of the nonaqueous electrolyte secondary battery 1 can become excellent.

In the general formula (1), an element Sn can react with Li having an amount four times as much as the amount of Sn and serves to outstandingly improve a capacity.

Further, $M^1$ designates at least one kind of material selected from Co and Cu. The element $M^1$ serves to improve the capacity or the cyclic characteristics. $M^1$ is more preferably Co.

x is located within a range expressed by $0.1<x\leq2$. When x is smaller than 0.1, an action for improving the cyclic characteristics is insufficient. Further, when x is larger than 2, a capacity is deteriorated. x is located within a range expressed by $0.1<x\leq2$ so that the cyclic characteristics can be improved without deteriorating the capacity. x is preferably located within a range expressed by $0.1<x\leq1.5$ and more preferably located within a range expressed by $0.2\leq x\leq1$.

$M^2$ designates at least one kind of material selected from Cr, Fe, Mn, Nb, Mo, W, B and P. The element $M^2$ is an element which does not react with Li, however, this element serves to suppress the decay of particles due to the change of volume resulting from the doping and doping of Li during charging and discharging operations and improve the cyclic characteristics. $M^2$ is preferably at least one kind of element selected between Cr, Mn, B and P, and more preferably Cr or B.

y is located within a range expressed by $0<y\leqq2$. When y is 0, an action for suppressing the decay of particles due to the volume change upon charging and discharging operations cannot be obtained. When y is larger than 2, the rate of the element which does not react with Li is increased, so that a capacity is reduced. y is located within a range expressed by $0<y\leqq2$, and accordingly the decay of particles due to the volume change can be suppressed and the cyclic characteristics can be improved without deteriorating the capacity. y is preferably located within a range expressed by $0<y\leqq1.5$ and more preferably located within a range expressed by $0.2\leqq y\leqq1$.

$M^3$ designates at least one kind of material selected from In, Ag, Zn and Al. The element $M^3$ can react with Li and serves to improve the cyclic characteristics. $M^3$ is preferably at least one kind of element selected from In, Zn and Al, and more preferably Zn or Al.

z is located within a range expressed by $0<z\leqq1$. When z is 0, an action for improving the cyclic characteristics cannot be obtained. Further, when z is larger than 1, voltage characteristics are deteriorated. z is located within a range expressed by $0<z\leqq1$, so that the cyclic characteristics can be improved without deteriorating the voltage characteristics. z is more preferably located within a range expressed by $0.2\leqq z\leqq1$.

Further, x+y is preferably located within a range expressed by $0.2\leqq x+y\leqq2.5$. When x+y is smaller than 2, the cyclic characteristics are deteriorated. When x+y is larger than 2.5, the content of Sn of the compound is decreased, so that the capacity is decreased. x+y is located within a range expressed by $0.2\leqq x+y\leqq2.5$, a range of 10 µm or larger and 70 µm or smaller. When the particle diameter is too small, an undesirable reaction is obviously generated between the surfaces of the particles and electrolyte solution to deteriorate a capacity and efficiency. When the particle diameter is too large, a reaction between the particles and Li hardly advances in the inner parts of the particles to decrease the capacity. The diameter of the Sn-containing compound is located within the above-described range, so that the undesirable reaction between the surfaces of the particles and the electrolyte solution can be suppressed, the reaction of particles with Li can be advanced to the inner parts of the particles and the capacity or the efficiency can be improved.

Methods for measuring a particle diameter include an observation method by an optical microscope or an electron microscope, a laser diffraction method, etc. and these methods are preferably selectively employed depending on the region of size of the particles. In order to obtain a desired particle diameter, a classification may be carried out. A classification method is not especially limited. A sieve, an air classifier, or the like may be used both in a dry type and in a wet type as required.

The Sn-containing compound may be crystalline or amorphous. The Sn-containing compound is preferably an amorphous or microcrystalline aggregate. The amorphous compound or the microcrystalline compound described in the specification designates a compound which has a half-value width of 2 at 0.5° or more in the peak of a diffraction pattern obtained by a CuKα-X ray diffraction and further has a broad pattern with 2 within a range of 30° to 60°.

The Sn-containing compound may be coated with other compounds, for instance, oxides, organic materials and inorganic materials.

The separator 4 is disposed between the cathode 2 and the anode 3 to prevent a short-circuit due to the physical contact of the cathode 2 and the anode 3. As the separator 4, a microporous polyolefin film such as polyethylene film, polypropylene film, etc. is employed. In order to ensure the reliability of a battery, the film preferably has a function for closing the pores at 80° C. or higher to increase resistance and cut off a current. The temperature at which the pores are closed preferably ranges 90° C. to 180° C.

Nonaqueous electrolyte solution is prepared by dissolving electrolyte in a nonaqueous solvent. As the nonaqueous solvent, well-known nonaqueous solvents ordinarily used in the electrolyte solution of the battery can be used. Specifically, there may be employed propylene carbonate, ethylene carbonate, diethyl carbonate, methyl ethyl carbonate 1,2-dimethoxyethane, 1,2-diethoxyethane, γ-butyrolactone, tetrahydrofiran, 2-methyl tetrahydrofuran, 1,3-dioxolane, 4-methyl-1,3-dioxolane, diethyl ether, sulfolane, methyl sulfolane, acetonitrile, propiononitrile, anisole, acetic ester, propionic ester, etc. These nonaqueous solvents may be independently used and a plurality of kinds of them may be mixed and the mixture may be used.

As the electrolytes, well-known electrolytes ordinarily employed in the electrolyte solution of the battery can be used. Specifically, there may be exemplified lithium salts such as $LiClO_4$, $LiAsF_6$, $LiPF_6$, $LiBF_4$, $LiB(C_6H_5)_4$, $LiCH_3SO_3$, $LiCF_3SO_3$, LiCl, LiBr, etc.

The above-described cathode 2 and the anode 3 are spirally coiled many times through the separator 4 in a tightly contacted state to form a spirally coiled body. An insulating plate 6 is disposed on the bottom part of the battery can 5 made of iron whose inside is plated with nickel. On the insulating plate 6, the above-described spirally coiled body is accommodated.

One end of an anode lead 7 made of, for instance, nickel for collecting the electric current of the anode is attached under pressure to the anode 3 and the other end is welded to the battery can 5. Thus, the battery can 5 is electrically connected to the anode 3 and serves as an external anode of the nonaqueous electrolyte secondary battery 1.

One end of a cathode 8 lead made of, for instance, aluminum for collecting the electric current of the cathode 2 is attached to the cathode 2 and the other end is electrically connected to a battery cover 10 through a current cutting-off thin plate 9. This current cutting-off thin plate 9 cuts off the current in accordance with the internal pressure of the battery. Thus, the battery cover 10 is electrically conducted to the cathode 2 and serves as an external cathode of the nonaqueous electrolyte secondary battery 1.

The nonaqueous electrolyte solution is injected into the battery can 5 and the coiled body is immersed in the electrolyte solution. The battery can 5 is caulked through an insulating sealing gasket 11 to which asphalt is applied. Thus, the battery cover 10 is fixed to the battery can 5.

In the nonaqueous electrolyte secondary battery 1 to which the present invention is applied; as shown in FIG. 1, a center pin 12 connected to the anode lead 7 and the cathode lead 8 is provided, and a safety valve device 13 for purging gas in the battery when pressure in the battery is higher than a prescribed value and a PTC element 14 for preventing the rise of temperature in the battery are provided.

In the nonaqueous electrolyte secondary battery 1, since the Sn-containing compound expressed by the general formula $SnM^1_xM^2_yM^3_z$ is included in the anode composite mixture, the battery is excellent in its capacity, cyclic characteristics, and load characteristics. Since the Sn-containing compound does, not include such an element as to give an adverse effect to the global environment or a human body, this compound is preferable from an environmental point of view.

The nonaqueous electrolyte secondary battery is not especially limited to a specific form such as a cylindrical form, a prismatic form, a coin form, a button form, etc. Further, the nonaqueous electrolyte secondary battery may have various kinds of size such as a thin shape, a large shape, etc.

The use of the nonaqueous electrolyte secondary battery according to the present invention is not especially limited. The nonaqueous electrolyte secondary battery can be employed as the power source of a portable electronic device such as a headphone stereo, a video movie, a liquid crystal television, a portable CD, a minidisc, a note book type personal computer, a portable telephone, an electric shaver, a transceiver, an electronic note, an electronic calculator, a radio, a toy, a game device, a watch, a pacemaker, etc. Further, the nonaqueous electrolyte secondary battery may be combined and used with a generator of a solar cell, a fuel cell, or the like.

Now, some Examples carried out to recognize the effects of the present invention will be described below. Although the following Examples will be described by employing specific numeric values, the present invention is not limited thereto.

EXAMPLE 1

An Sn-containing compound A was synthesized as described below. Firstly, Sn powder, Co powder, Cr powder and In powder were respectively weighed and mixed together in the elemental ratio (atomic ratio) 1/0.6/0.6/0.2 so as to have the total of 15 g.

Then, by a planetary ball mill with a mixture in the weight ratio of the ball/the mixture 20/1 under an atmosphere of Ar, mechanical alloying was carried out for 60 hours. Obtained black powder was screened by a sieve with aperture of 250 µm to obtain the Sn-containing compound A. From the observation by a secondary electron microscope, it was recognized that primary particles of about 1 µm secondarily aggregated. The particle diameter obtained by a laser diffraction method was 25 µm.

A cylindrical type nonaqueous electrolyte secondary battery as shown in FIG. 1 was manufactured by using the obtained Sn-containing compound A.

Initially, a cathode was manufactured in such a manner as described below. $LiNi_{0.8}Co_{0.19}Al_{0.01}O_2$ having an average secondary particle diameter of 15 µm was used as a cathode active material. The cathode active material of 91 wt %, graphite of 6 wt % as a conductive material and polyvinylidene fluoride of 3 wt % as a binding agent were mixed together to prepare a cathode composite mixture. The cathode composite mixture was dispersed in N-methyl-2-pyrrolidone to form slurry. This slurry was applied to an aluminum foil with the thickness of 20 µm as a cathode current collector, dried and compression-molded by a roller press machine. Then, the obtained product was cut to form an elongated cathode.

Then, an anode was manufactured in such a manner as described below. Needle shaped artificial graphite of 45 wt %, polyvinylidene fluoride of 10 wt % as a binding agent and the obtained Sn-containing compound A of 45 wt % were mixed together to prepare an anode composite mixture. The anode composite mixture was dispersed in N-methyl-2-pyrrolidone to have slurry. This slurry was applied to both the surfaces of a copper foil with the thickness of 15 µm serving as an anode current collector, dried and compression-molded by a roller press machine. Then, the obtained product was cut to form an elongated anode.

The elongated cathode and the elongated anode manufactured as mentioned above were laminated through a separator made of a microporous polyethylene film with the thickness of 25 µm and coiled to form an electrode element.

The electrode element manufactured as described above was accommodated in a battery can made of iron. An insulating plate was disposed on the lower surface of the electrode element. Then, a cathode lead to which an insulating tape is stuck was drawn from the cathode current collector and welded to a safety valve device and an anode lead was drawn from the anode current collector and welded to the battery can. An insulating plate was disposed between the cathode lead and the safety valve device. After that, nonaqueous electrolyte solution was injected into the battery can. This nonaqueous electrolyte solution was prepared by dissolving $LiPF_6$ in the mixed liquid of ethylene carbonate and ethyl methyl carbonate in the concentration of 1 mole/liter.

Finally, the battery can was caulked through an insulating sealing gasket to which asphalt is applied to fix a battery cover thereto so that a cylindrical type nonaqueous electrolyte secondary battery having a diameter of 18 mm and height of 65 mm was completed.

EXAMPLE 2 TO EXAMPLE 14

Sn-containing compounds B to N were synthesized in the same manner as that of the Sn-containing compound A except that used elements and elemental composition ratios were shown in Table 1 when the Sn-containing compounds were synthesized.

In the-Example 2 to the Example 14, cylindrical type nonaqueous electrolyte secondary batteries were manufactured in the same manner as that of the Example 1 by respectively using the obtained Sn-containing compound B to the Sn-containing compound N except that the compositions of anode composite mixtures and used cathode active materials were shown in Table 2.

The used elements of the Sn-containing compound A to the Sn-containing compound N and the elemental composition ratios thereof were shown in Table 1. Further, the compositions of anode composite mixtures and used cathode active materials were shown in Table 2.

Comparative Example 1 to Comparative Example 6

Sn-containing compounds O to S were synthesized in the same manner as that of the Sn-containing compound A except that used elements and; an elemental composition ratios were shown in Table 1 when the Sn-containing compounds were synthesized.

In the Comparative Example 1 to the Comparative Example 5, cylindrical type nonaqueous electrolyte secondary batteries were manufactured in the same manner as that of the Example 1 by respectively using the obtained Sn-containing compound O to the Sn-containing compound S except that the compositions of anode composite mixtures and used cathode active materials were shown in Table 2.

Further, a cylindrical type nonaqueous electrolyte secondary battery was manufactured in the same manner as that of the Example 1 without using an Sn alloy compound and it was used as a Comparative Example 6.

The used elements of the Sn-containing compound A to the Sn-containing compound N and the elemental composition ratios thereof are shown in Table 1. Further, the compositions of anode composite mixtures and used cathode active materials are shown in Table 2.

TABLE 1

| | Elemental Composition Ratio | | | | Particle Diameter (μm) |
|---|---|---|---|---|---|
| | x | y | | z | |
| Compound A | Sn:1 | Co:0.6 | Cr:0.6 | In:0.2 | 25 |
| Compound B | Sn:1 | Co:0.6 | Fe:0.6 | Ag:0.2 | 24 |
| Compound C | Sn:1 | Co:0.3 Cu:0.3 | Cr:0.6 | Al:0.2 | 28 |
| Compound D | Sn:1 | Co:0.6 | Mn:0.6 | Zn:0.2 | 20 |
| Compound E | Sn:1 | Co:0.6 | Nb:0.6 | Zn:0.2 | 35 |
| Compound F | Sn:1 | Co:0.6 | B:0.6 | Al:0.2 | 15 |
| Compound G | Sn:1 | Co:1.0 | P:0.1 | In:0.2 | 30 |
| Compound H | Sn:1 | Co:0.4 | Cr:0.6 B:0.2 | Zn:0.2 | 20 |
| Compound I | Sn:1 | Co:0.4 | Cr:0.6 P:0.1 | Zn:0.2 | 10 |
| Compound J | Sn:1 | Cu:0.2 | Cr:0.1 P:0.05 | Al:0.4 | 24 |
| Compound K | Sn:1 | Cu:1 | Mn:0.6 P:0.1 | Zn:0.3 | 35 |
| Compound L | Sn:1 | Co:0.8 | W:1.8 | Ag:0.6 | 90 |
| Compound M | Sn:1 | Co:0.9 | Mo:1.7 | In:0.6 | 55 |
| Compound N | Sn:1 | Cu:1.6 | Fe:1 P:0.1 | Ag:0.8 | 40 |
| Compound O | Sn:1 | Cu:1.2 | 0 | 0 | 20 |
| Compound P | Sn:1 | Co:2.5 | 0 | 0 | 20 |
| Compound Q | Sn:1 | 0 | Fe:0.5 | 0 | 35 |
| Compound R | Sn:1 | Co:2.5 | Cr:2.2 | In:1.3 | 20 |
| Compound S | Sn:1 | Co:2.5 | Cr:2.2 | In:1.2 | 90 |

TABLE 2

| | Anode Alloy | Anode Alloy/ Carbon/Binder (Weight Ratio) | Cathode Active Material |
|---|---|---|---|
| Example 1 | Compound A | 45/45/PVdF 10 | $LiNi_{0.8}Co_{0.19}Al_{0.01}O_2$ |
| Example 2 | Compound B | 45/45/PVdF 10 | $LiNi_{0.8}Co_{0.19}Al_{0.01}O_2$ |
| Example 3 | Compound C | 45/45/PVdF 10 | $LiNi_{0.8}Co_{0.19}Al_{0.01}O_2$ |
| Example 4 | Compound D | 45/45/PVdF 10 | $LiNi_{0.8}Co_{0.19}Al_{0.01}O_2$ |
| Example 5 | Compound E | 45/45/PVdF 10 | $LiNi_{0.8}Co_{0.19}Al_{0.01}O_2$ |
| Example 6 | Compound F | 45/45/PVdF 10 | $LiNi_{0.8}Co_{0.19}Al_{0.01}O_2$ |
| Example 7 | Compound G | 45/45/PVdF 10 | $LiNi_{0.8}Co_{0.19}Al_{0.01}O_2$ |
| Example 8 | Compound H | 45/45/PVdF 10 | $LiCoO_2$ |
| Example 9 | Compound I | 75/10/PVdF 15 | $LiNi_{0.8}Co_{0.19}Al_{0.01}O_2$ |
| Example 10 | Compound J | 75/10/PVdF 12, styrene butadiene rubber 3 | $LiMn_{0.65}Fe_{0.35}PO_4$ |
| Example 11 | Compound K | 75/10/PVdF 10, polyethylene 5 | $LiFePO_4$ |
| Example 12 | Compound L | 30/60/PVdF 5, styrene butadiene rubber 5 | $LiFePO_4$ |
| Example 13 | Compound M | 86/4/PVdF 5, styrene butadiene rubber 5 | $LiNi_{0.8}Co_{0.19}Al_{0.01}O_2$ |
| Example 14 | Compound N | 30/60/PVdF 5, polyethylene 5 | $LiNi_{0.8}Co_{0.19}Al_{0.01}O_2$ |
| Comparative Example 1 | Compound O | 45/45/PVdF 10 | $LiNi_{0.8}Co_{0.19}Al_{0.01}O_2$ |
| Comparative Example 2 | Compound P | 45/45/PVdF 10 | $LiNi_{0.8}Co_{0.19}Al_{0.01}O_2$ |
| Comparative Example 3 | Compound Q | 45/45/PVdF 10 | $LiNi_{0.8}Co_{0.19}Al_{0.01}O_2$ |
| Comparative Example 4 | Compound R | 45/45/PVdF 10 | $LiNi_{0.8}Co_{0.19}Al_{0.01}O_2$ |
| Comparative Example 5 | Compound S | 88/2/PVdF 10 | $LiNi_{0.8}Co_{0.19}Al_{0.01}O_2$ |
| Comparative Example 6 | — | 0/90/PVdF 10 | $LiNi_{0.8}Co_{0.19}Al_{0.01}O_2$ |

For each of the batteries of the Example 1 to the Example 14 and the Comparative Example 1 to the Comparative Example 6 manufactured as described above, a charging and discharging test was carried out to evaluate a capacity, cyclic characteristics and load characteristics.

As for the cyclic characteristics, a charging operation was carried out under a constant-current of 1 A up to 4.20 Vmax. Specifically, a constant-current charging operation was carried out up to 4.2 V. After reaching 4.20 V, a constant-voltage charging operation was carried out for 15 hours for a first cycle. After the first cycle, a constant-voltage charging operation was performed for 5 hours. Further, a discharging operation of a constant-current of 1 A was carried out until cut off to 2.5 V.

The above-described cycle was performed 100 times. A discharging capacity maintaining/retention ratio (%) was obtained from the capacity of the second cycle and the capacity of the 100th cycle in accordance with (capacity of 100th cycle/capacity of second cycle)×100.

As the load characteristics, a charging operation was carried out under a constant current of 1 A up to 4.20 Vmax. Specifically, a constant-current charging operation was carried out up to 4.2 V. After reaching 4.20 V, a constant-voltage charging operation was carried out for 15 hours for a first cycle. After the first cycle, a constant-voltage charging operation was performed for 5 hours. Further, a discharging operation of a constant-current of 1 A was carried out until cut off to 2.5 V for the first and second cycles. A discharging operation for a third cycle was carried out under a current of 4 A was carried out until cut off to 2.5 V.

Then, the anode characteristics were obtained from the capacity of the second cycle and the capacity of the third cycle in accordance with(the capacity of the third cycle/the capacity of the second cycle)×100.

The evaluated results of the capacity, the cyclic characteristics and the load characteristics of the batteries of the Example 1 to the Example 14 and the Comparative Example 1 to the Comparative Example 5 are shown in Table 3.

TABLE 3

| | Capacity (mAh) | Capacity Maintaining/ retention Ratio of 100 Cycle (%) | Load Characteristics (%) |
|---|---|---|---|
| Example 1 | 2410 | 92 | 75 |
| Example 2 | 2300 | 80 | 70 |
| Example 3 | 2310 | 90 | 77 |
| Example 4 | 2340 | 91 | 76 |
| Example 5 | 2290 | 81 | 71 |
| Example 6 | 2410 | 91 | 78 |
| Example 7 | 2260 | 91 | 77 |
| Example 8 | 2300 | 90 | 75 |
| Example 9 | 2540 | 93 | 81 |
| Example 10 | 2300 | 90 | 76 |
| Example 11 | 2250 | 89 | 75 |
| Example 12 | 2120 | 84 | 63 |
| Example 13 | 2290 | 82 | 69 |
| Example 14 | 2200 | 82 | 69 |
| Comparative Example 1 | 2250 | 60 | 65 |
| Comparative Example 2 | 2310 | 65 | 64 |
| Comparative Example 3 | 2380 | 40 | 69 |
| Comparative Example 4 | 2000 | 69 | 47 |
| Comparative Example 5 | 2000 | 42 | 41 |
| Comparative Example 6 | 1650 | 80 | 71 |

Firstly, as apparent from the Table 3, the capacity of each of the batteries is improved more by adding the Sn-containing compound to the anode than the battery of the Comparative Example 6 in which the Sn-containing compound is not added to the anode.

Now, the elemental composition ratio x, y and z of the Sn-containing compound expressed by the general formula $SnM^1_xM^2_yM^3_z$ will be considered. As understood from the Table 3, in the Comparative Example 3 using a compound Q in which x is 0, the cyclic characteristics are poor. Further, in the Comparative Example 2, the Comparative Example 4, and the Comparative Example 5 using compounds P, R and S in which x is larger than 2, effects for improving the capacity, the cyclic characteristics and the load characteristics are lowered.

Then, as for y, in the Comparative Example 1 and the Comparative Example 2 using compounds O and P in which y is 0, the cyclic characteristics are not good. Further, in the Comparative Example 4 and the Comparative Example 5 using compounds R and S in which y is larger than 2, an effect for improving a capacity is lowered.

As for z, in the Comparative Example 1, the Comparative Example 2, and the Comparative Example 3 using compounds O, P and Q in which z is 0, the cyclic characteristics are not good. Further, in the Comparative Example 4 and the Comparative Example 5 using the compounds R and S in which z is larger than 1, effects for improving the capacity, the cyclic characteristics and the load characteristics are decreased.

On the other hand, in the Example 1 to the Example 14 using the compound A to the compound N in which x is located within a range expressed by $0.1 < x \leq 2$, y is located within a range expressed by $0 < y \leq 2$ and z is located within a range expressed by $0 < z \leq 1$, the effects for improving the capacity, the cyclic characteristics and the load characteristics are sufficiently exhibited in the Sn-containing compounds. Each of Examples apparently realizes good capacity, cyclic characteristics and load characteristics.

Accordingly, in the Sn-containing compound expressed by the general formula $SnM^1_xM^2_yM^3_z$, it was understood that x satisfied a range expressed by $0.1 < x \leq 2$, y satisfied a range expressed by $0 < y \leq 2$ and z satisfied a range expressed by $0 < z \leq 1$ so that the capacity; the cyclic characteristics and the load characteristics could be improved. Furthermore, it was understood that when x+y satisfied a range expressed by $0.2 \leq x+y \leq 2.5$, specially excellent results could be obtained.

INDUSTRIAL APPLICABILITY

As described above, the Sn-containing compound expressed by the general formula $SnM^1_xM^2_yM^3_z$ is included in the anode, so that the nonaqueous electrolyte secondary battery excellent in its capacity, cyclic characteristics and load characteristics can be realized.

The invention claimed is:

1. A nonaqueous electrolyte secondary battery comprising an anode capable of doping and dedoping lithium, a cathode and a nonaqueous electrolyte, the anode including a carbon material, a polymer material and a Sn-containing compound expressed by a general formula (1):

$$SnM^1_xM^2_yM^3_z \qquad (1)$$

wherein,
$M^1$ designates at least one kind of material selected from the group consisting of Co and Cu,
$M^2$ designates at least one kind of material selected from the group consisting of Cr, Fe, Mn, Nb, Mo, W, B and P,
$M^3$ designates at least one kind of material selected from the group consisting of In, Ag, Zn and Al,
x, y and z are respectively represented by $0.1 < x \leq 2$, $0 < y \leq 2$ and $0 < z \leq 1$),
the anode includes the carbon material from 5 wt % to 85 wt % of an anode composition,
the average particle diameter of the Sn-containing compound is in a range of 0.1 μm to 80 μm,
the polymer material includes at least one selected from the group consisting of polyvinylidene fluoride, styrene butadiene rubber, and polyethylene, and
the cathode includes a cathode active material comprising a Li-containing transition metal oxide which includes at least one selected from the group consisting of Co, Ni, Mn and Fe.

* * * * *